United States Patent [19]

Luciani et al.

[11] Patent Number: 4,736,871
[45] Date of Patent: Apr. 12, 1988

[54] LIQUID MEASURING DISPENSER

[76] Inventors: Dorian E. Luciani, 1 Painted Cup, The Woodlands, Tex. 77380; William A. Ryan, 25200 N. I. 45, Spring, Tex. 77386

[21] Appl. No.: 932,430

[22] Filed: Nov. 19, 1986

[51] Int. Cl.4 .............. B67D 5/06; G04C 1/12
[52] U.S. Cl. ........................ 222/25; 222/30; 222/37; 222/71; 222/641; 346/14 MR
[58] Field of Search ............. 222/30, 36, 37, 25, 222/71, 641; 221/2, 7, 8; 340/825.35; 364/479, 510, 465; 200/186; 346/14 MR

[56] References Cited

U.S. PATENT DOCUMENTS

| Re. 31,434 | 11/1983 | Reilly | 222/641 X |
|---|---|---|---|
| 2,315,805 | 4/1943 | Mayo | 73/194 |
| 3,170,597 | 2/1965 | Reichenberger | 222/30 X |
| 3,242,729 | 3/1966 | Keller | 73/194 |
| 3,748,654 | 7/1973 | Sutherland | 346/14 MR X |
| 3,820,392 | 6/1974 | Beck | 73/194 |
| 4,265,370 | 5/1981 | Reilly | 222/25 |
| 4,369,442 | 1/1983 | Werth et al. | 340/825.35 |
| 4,436,223 | 3/1984 | Wilson | 222/36 |
| 4,584,527 | 4/1986 | Amigo | 364/14 MR X |
| 4,611,205 | 9/1986 | Eglise | 364/465 X |

Primary Examiner—Joseph J. Rolla
Assistant Examiner—Gregory L. Hudson
Attorney, Agent, or Firm—Paul L. DeVerter, II

[57] ABSTRACT

A dispenser for conductive liquids which includes appropriate circuit elements to measure the volume of liquid dispensed therethrough, and particularly useful in the bar and restaurant trade. The dispenser also includes circuitry to record the number of times it is removed from a container. Probes are provided for actuating a display and for remote recording and reading.

8 Claims, 3 Drawing Sheets

LIQUID MEASURING DISPENSER

BACKGROUND OF THE INVENTION

This invention concerns a dispenser for liquids which contains an electronic measuring and recording device. The dispenser is designed primarily for use in the bar and restaurant trade, but may also be utilized to measure other conductive liquids, such as detergents, syrup, and water, which are to be dispensed from a container through the device.

A variety of recording dispensers have been suggested in the past, and two of the most pertinent examples are found in the patent to Wilson, U.S. Pat. No. 4,436,223 and the patent to Reilly, U.S. Pat. No. 4,265,370. The prior devices record a count of the number of times that a predetermined quantity of the liquid is to be dispensed. The present invention provides a continuous count of the volume of liquid dispensed, without regard to a predetermined measure, which count can be kept secure from the person whose job it is to dispense the liquid. Further, the present invention also counts and records the number of times that the dispenser is removed from the container to which it is attached.

SUMMARY

Particularly in the bar and restaurant trade, the "shrinkage" of bar supplies is a constant problem. In addition, it is desirable to be able to inventory the bar supplies with a minimum amount of handling, and with a high degree of accuracy. Further, it is desirable to record the number of times that the dispenser has been removed from the container, as a method to keep track of a number of containers or bottles which have been utilized. Finally, it is usually desirable that the recording device flow measurement be kept secure from the bartender himself, as well as the fact that an inventory has been taken, so as to reduce the risk of attempts to bypass the system.

It is an object of the present invention to provide the foregoing features and advantages.

It is a further object of the present invention to provide a liquid measuring dispenser which can be attached to a common liquid container or bottle for recording any volume of liquid dispensed from the container.

It is another object of this invention to provide a dispenser which utilizes commonly available electronic components for recording any volume of liquid dispensed, the number of times the dispenser has been changed to other containers, and to display this information, and to transfer it to other recording devices, upon command.

Other and further objects, features and advantages will be apparent from the following description of the presently preferred embodiments of the invention, given for the purpose of disclosure, when taken in conjunction with the following drawings.

BRIEF DESCRIPTION OF THE DRAWINGS

Like character references designate like parts throughout the several views of the drawings, which are.

DESCRIPTION OF THE PREFERRED EMBODIMENTS

Figure 1:
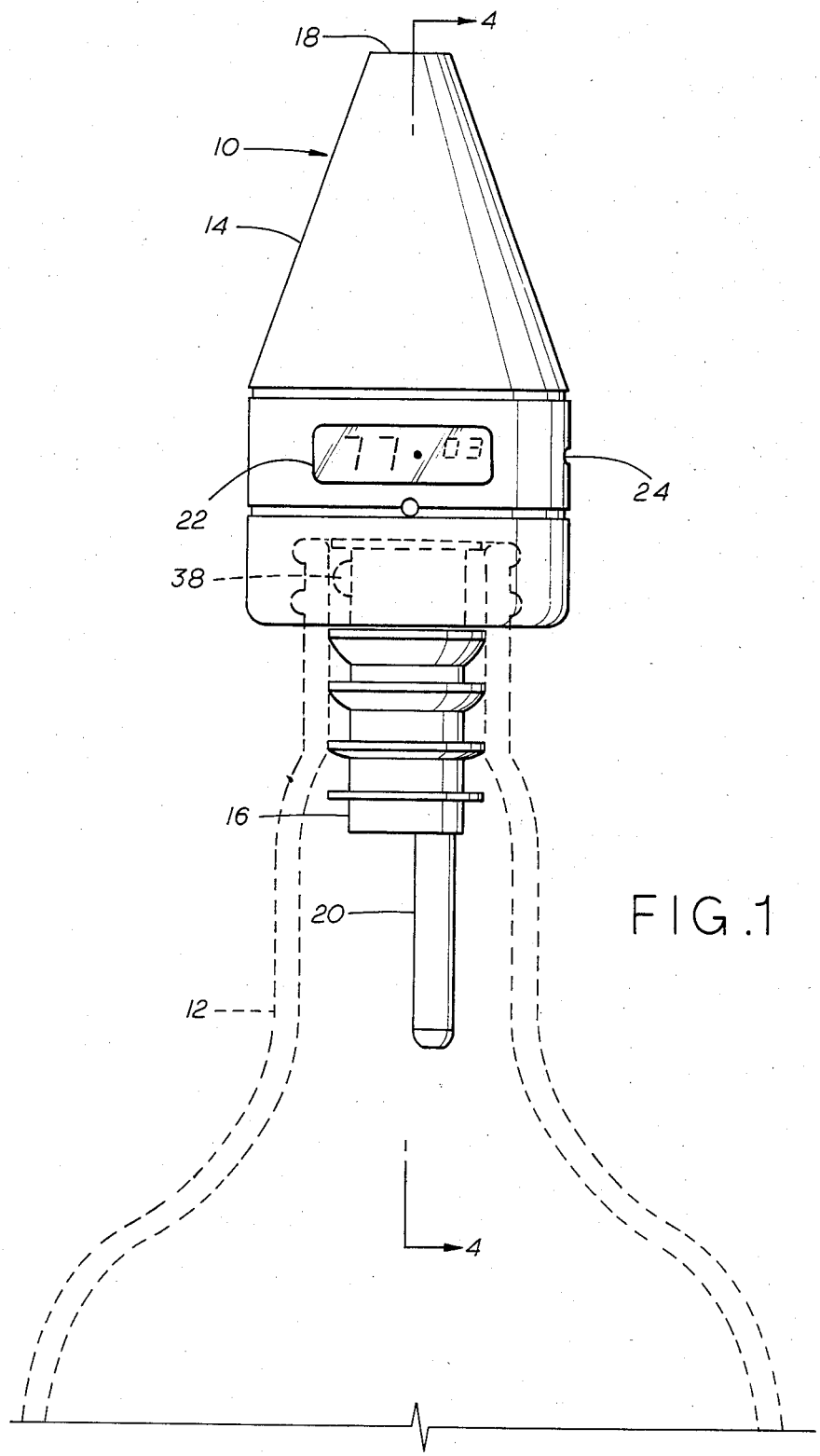
FIG. 1 is a side view of the dispenser, partially in section, showing the invention mounted on a container.

Referring now to the drawings and particularly to FIG. 1, the reference numeral 10 generally designates the liquid measuring dispenser of the present invention. As will be discussed more fully hereinafter, the liquid to be measured is dispensed through the dispenser 10, and in so doing the amount of time that the liquid is in contact with two electrical sensors is timed and recorded. For any given liquid, the amount of time which it takes for the liquid to run through a tube of a certain diameter is essentially a constant, inasmuch as the environmental temperature and pressure do not fluctuate appreciably, as would be the case in the environment of most bars and restaurants. The dispenser 10 is designed to be pushed into the neck of the container 12, here shown as an ordinary liquor bottle, in a conventional manner. The dispenser 10 includes a housing 14 which holds the various electronic components, and which housing has an inlet tube 16 and an outlet spout 18 thereon. Further, the dispenser includes an air tube 20, which operates in a conventional manner to allow the flow of air into the container 12 as the liquid in the container flows out of the spout 18. Also shown mounted on the housing is a display means 22, here shown as displaying the numbers 77 as the number of ounces dispensed, and the number 03 as the number of times the dispenser has been removed from a container. Also seen on the housing 14 is the actuation switch 24 which is utilized to activate the display of the numbers recorded in the counting and recording means to be described hereinafter.

Figures 2, 4:
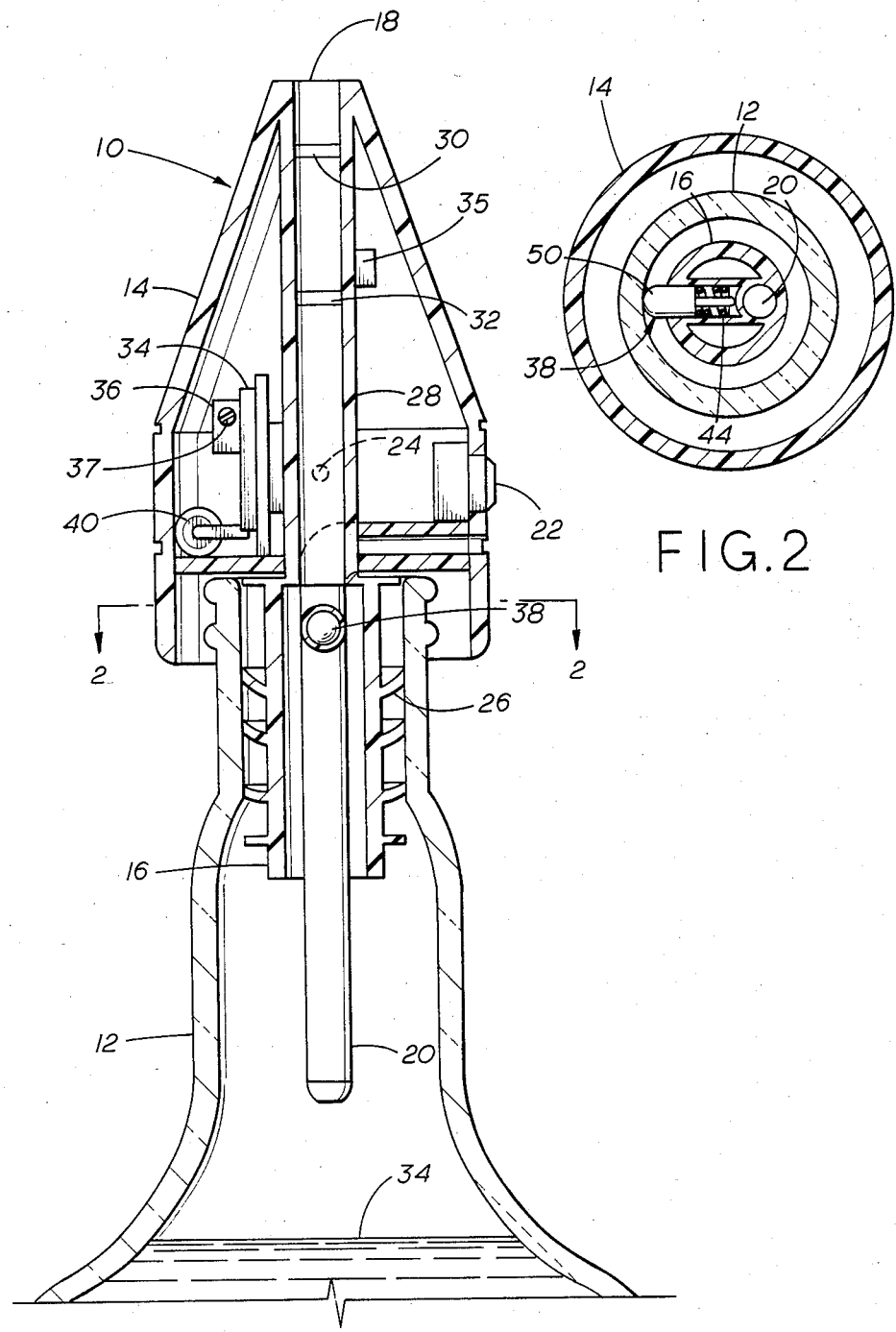
FIG. 2 is a sectional view, taken along the line 2—2 of FIG. 4, particularly showing the removal switch.
FIG. 4 is a sectional view, taken along the line 4—4 of FIG. 1.

Referring now to FIG. 4, it will be seen that the inlet tube 16 has a number of radial fins 26 extending thereabout which, in a conventional manner, serve to retain the dispenser 10 within the container 12. Within the housing 14 is a pourer tube 28 which interconnects the inlet tube 16 and the spout 18. The pourer tube is made of a non-conductive material, and mounted within it, so as to be exposed to liquid flowing through the pourer tube are electrical sensors 30 and 32. These sensors are spaced apart and are normally insulated from one another. However, when a conductive liquid 34 is present within the pourer tube 28 and touching both sensors, then the sensors 30 and 32 are electrically connected through the liquid.

Also mounted within the housing 14 is a tilt switch 35, which may be a conventional mercury switch, whose function is to complete a circuit when the dispenser is tilted sufficiently for a liquid to flow through the pourer tube 28 from the inlet tube 16 to the spout 18. Otherwise, the tilt switch 35 is open. Also mounted in the housing 14 is the display means 22, the logic circuit 34, the pulse generator or clock 36 and the actuation switch 24. The logic circuit 34 and the pulse generator 36 make up the counting and recording means for recording the length of time that the sensors 30 and 32 are connected together. In addition, mounted within the housing, and arranged to be within the neck of the container 12 is a removal switch 38. Also within the housing is a battery 40 for providing electrical power for operation of the counting and recording device and associated circuitry.

Turning now to FIG. 2, a sectional view through the removal switch 38 is shown with the dispenser situated in the neck of the container 12. The removal switch incorporates a plunger 50 which is depressed into the housing 14 and more particularly the inlet tube 16 because of the container 12 when the dispenser is inserted into the container 12. When the plunger 50 is moved outwardly by the spring 44 it completes an electrical circuit in a conventional manner, which will in turn indicate that the dispenser has been removed from the container, and this function will be recorded by the counting and recording means. The removal switch is wired to reset the count of the volume of liquid dispensed to zero upon actuation.

Figure 3:
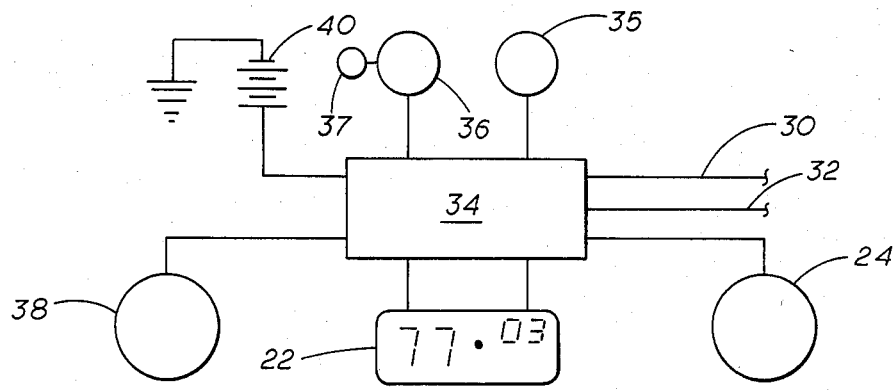
FIG. 3 is a schematic block diagram of the electronic circuit including the counting and recording means used in this invention.

Referring now to FIG. 3, a generalized schematic of the electrical circuit is shown. The circuit elements include the sensors 30 and 32 which are connected to the logic circuit 34. In addition, the tilt switch 35 is also connected to the logic circuit 34 as is the pulse generator 36 and the battery 40, along with the actuation switch 24 and the removal switch 38. Driven by the logic circuit 34 in a conventional manner is the display means 22, which may be of the light emitting diode or the liquid crystal display type.

In operation, when the dispenser 10 is tilted, the tilt switch 36 is actuated. Further, when contact is made between the sensors 32 and 30 because of the conductive liquid within the container passing through the pourer tube 28, the pulse generator begins operation and the number of pulses is counted and retained by the logic circuit 34. By the same token, when there is no longer a conducting liquid between the sensors 30 and 32, then the logic circuit no longer counts. The length of count is a function of the volume of liquid which moves through the pourer tube 28. The total count can be calibrated for different diameters of pourer tubes, viscosities of liquids, and other physical parameters, so that the time count can be a function of fluidounces, cubic centimeters, milliliters, or the like. If desired, the pulse generator rate may be adjusted by an adjustment means 37, such as a potentiometer, in a conventional manner for various flow rates and thus viscosities of liquids and desired measurements.

Upon actuation of the actuation switch 24, the count recorded in the logic circuit 34 will be displayed on the display means 22. Similarly, when the removal switch is actuated by removal of the dispenser from the container, this count is also recorded and can be displayed on the display means 22 upon actuation of the actuation switch 24. Finally, it is possible to incorporate a low battery indicator in the display means 22, here shown as the dot between the 77 and 03, to indicate when the battery 40 needs to be replaced, or recharged, depending upon its type.

Figure 5:
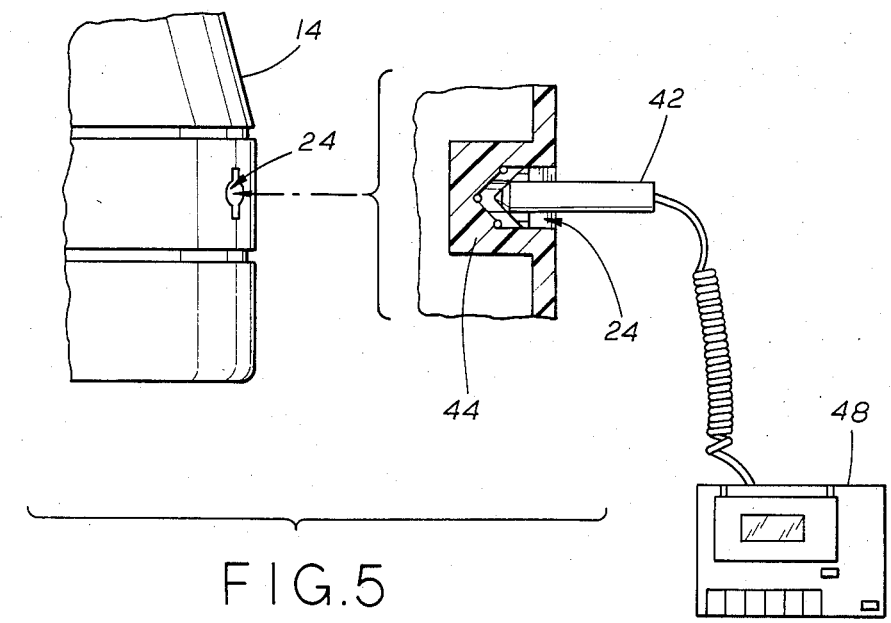
FIG. 5 is a partial view, partially in section showing one form of probe and probe receptor.

Referring now to FIG. 5, one version of the actuation switch 24 is shown. In this instance, there is a probe 42 and probe receptor 44. When the probe is inserted into the receptor 44, contact is made so that the display means 22 will display both the volume poured, and the number of times the dispenser has been removed from containers. In addition, the probe can be the connection to take this information to a separate recording means 48 or central calculator, such as shown diagrammatically in FIG. 5. It is contemplated that a code will also be transmitted from the logic circuit to show the serial number of the particular dispenser. The receptor is so made to also include a circuit which will allow the counting circuitry for the volume to be reset to 0, as by rotation of the probe 42.

Figure 6:
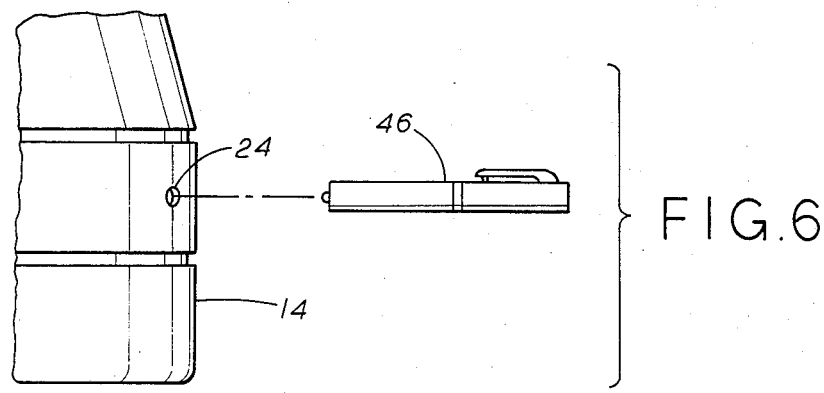
FIG. 6 is a partial view showing a further form of probe and receptor.

Referring now to FIG. 6, an alternative method of actuation of the actuation switch 24 is shown. In this embodiment, the actuation switch includes an infrared detector which is actuated by an infrared probe 46. In a conventional manner, the display means 22 will display both the volume pored and the number of times the dispenser has been removed from containers, when activated by the probe 46.

Thus it is seen that the present invention provides a means for recording the volume of a liquid dispensed from a container, as well as the number of times that the dispenser has been removed from various containers, and a means for retaining and recording this information in accordance with the objects of the invention.

The present invention, therefore, is well adapted to carry out the objects and obtain the ends and advantages mentioned, as well as others inherent therein. While the presently preferred embodiments of the invention have been given for the purpose of disclosure, numerous changes in the details of construction, in the combination, shape, size and arrangement of parts in uses may be resorted to without departing from the spirit and scope of the invention.

What is claimed is:

1. A liquid measuring dispenser for determining and recording the volume of a conductive liquid poured from a container through the dispenser, including:
    a housing having an inlet and an outlet spout,
    attachment means for securing the housing onto the container,
    a pourer tube interconnecting the inlet and the spout,
    the inlet communicating with the interior of the container,
    a first electrical sensor mounted adjacent the outlet spout,
    a second electrical sensor mounted in the pourer tube and spaced from the first sensor,
    the sensors being electrically connected to each other through the liquid, when the liquid is being poured from the container,
    a tilt switch in the housing which is closed upon tilting of the container for pouring,
    a removal switch in the housing which is closed when the housing is not attached to the container,
    the circuit including a battery,
    counting and recording means for recording the length of time the tilt switch is closed and the sensors are connected and thereby to record the volume of liquid poured, and for recording the number of times the housing is detached from the container,
    display means for displaying the recorded information,
    actuation switch means for activating the display means, and
    an electrical circuit within the housing connecting the sensors, the tilt switch, and the removal switch, the battery, the counting and recording means, the display means, and actuation switch.

2. The invention of claim 1 wherein the volume of liquid dispensed counting and recording means resets to zero when the removal switch is opened.

3. The invention of claim 1 wherein the circuit includes a low battery detecting and indicating means.

4. The invention of claim 1 wherein the counting means is adjustable as to rate whereby the count may be adjusted for viscosity of the liquid.

5. The invention of claim 1 including probe means, remote recording and display means, and
probe receptor means mounted in the housing, whereby the probe means may be interconnected with the receptor means to transmit the data recorded in the counting and recording means to the remote recording means.

6. The invention of claim 5 wherein the probe means includes an infrared detector and probe.

7. The invention of claim 1 wherein the actuation switch means includes:
a mechanical probe,
a mechanical probe receptor,
a probe circuit means within the probe and receptor for activating the display means when the probe is inserted into the receptor, and
reset switch means within the receptor for resetting the counting and recording means upon manipulation of the probe.

8. The invention of claim 7 including a remote recording and reading means connected to the probe.

* * * * *